May 15, 1962  W. P. WEGLARZ  3,035,151

SPARK MACHINING ELECTRODES AND METHOD OF MAKING THE SAME

Filed Feb. 24, 1960

INVENTOR.
Walter P. Weglarz
BY
Wm. R. Glisson
ATTORNEY

United States Patent Office 3,035,151
Patented May 15, 1962

3,035,151
SPARK MACHINING ELECTRODES AND METHOD OF MAKING THE SAME
Walter P. Weglarz, Philadelphia, Pa., assignor to The Budd Company, Philadelphia, Pa., a corporation of Pennsylvania
Filed Feb. 24, 1960, Ser. No. 10,604
7 Claims. (Cl. 219—69)

This invention relates to spark machining electrodes, especially for electro-discharge or spark machining of extensive articles such as dies, and to a method of forming the same, and has for an object the provision of improvements in this art.

Heretofore electrical spark machining has been generally restricted to relatively small two dimensional articles because of the high cost of electrodes consumed in the spark machining process.

In electrical spark machining the electrical discharge or arc between the electrode and the workpiece impinges against and disintegrates the metal of the workpiece. At the same instant the electrode is similarly affected by the arc. This disintegration of the electrode destroys the accuracy of the profile of the electrode adjacent the workpiece. This is not critical when machining two dimensional shapes for if the electrode is consumed a new portion of accurately formed electrode may be fed into the working area thus maintaining a high accuracy in a two dimensional plane. Since the distance or gap between the workpiece and the electrode is very critical a two dimensional pattern may be formed completely through flat sheets or plates without destroying the critical pattern at the edges of the electrode as it is fed into the hole or area being spark machined.

When attempts are made to spark machine three dimensional contours any portion of the face of the electrode that loses its critical accuracy renders the electrode unusable. This necessitates the replacement of the electrode or the electrode face in order to maintain the high accuracy of the profile being machined. Heretofore this expense has been so great that it has been cheaper to machine the workpiece to a desired accuracy rather than to machine a plurality of electrodes to achieve the same purpose.

In the present state of the art there is no known way to prevent disintegration of the electrode although it is well known in the art that some types of electrodes disintegrate faster than others.

It is also known that metal electrodes of high conductivity and high melting temperatures generally disintegrate slower than electrodes of low conductivity and low melting temperatures, although the exact correlation is not known.

The expense of machining several accurate electrodes from solid metal is more expensive than machining one accurate die. Electrodes cast to desired configuration shrink as the cast metal cools and the expense of machining them to accurate electrodes exceeds the cost of a die. Sintered electrodes made from powdered metal and replaceable face electrodes formed over patterns are not competitive with machining methods, nor have they produced the desired accuracy required of commercially used dies.

It would be extremely desirable to produce an electrode having a desired three dimensional contour by the cheapest possible method and yet maintain extremely high accuracy of the face of the electrode. It would also be desirable if this electrode disintegrated at a much lower rate than the workpiece during spark machining.

It is therefore a general object of the present invention to provide an electrode having superior resistance to disintegration during spark machining.

One of the particular object of the invention is to provide electrodes which have good electrical conductivity uniformly over an extensive surface area.

Another object is to provide an electrode which is highly resistant to surface deterioration whereby its active surface will maintain a very accurate shape.

Another object is to provide a simple and convenient method of forming an electrode.

Structures constructed in accordance with the preferred method are made from a wooden or plastic model having the exact shape and dimensional contour face as the article to be made by spark machining. A very thin layer of parting agent is applied to the model and a thin layer of molten metal is sprayed over the parting agent leaving a thin porous shell, graphite preferably in a colloidal solution is applied over the porous shell which has extremely fine porous cavities which act as capillary tubes to absorb the colloidal solution into the cavities, layers of metal are added to the first metal layer each in turn being substantially saturated with a graphite solution before the next layer is applied, the built up graphite saturated metal electrode is removed from the model when a desired thickness of electrode is formed. The formed electrode has the exact negative face contour as the model from which it was formed and will produce a positive face article.

The above and other objects and advantages and novel features of the invention will be apparent from the following description of an exemplary embodiment, reference being made to the accompanying drawings wherein.

Electro-discharge or spark machining has been known and used for a considerable time but so far as known its use has been limited largely to making small objects where electrode replacement is a relatively simple and inexpensive consideration. Large dies such as those used in auto body manufacture continue to be formed by conventional machining operations.

The present method and apparatus make it feasible to machine dies almost directly from the patterns or models which are made up in the early stages of normal die forming methods.

It will be helpful to consider the entire method of forming dies with which the present invention is involved.

First, an accurate smooth-surfaced wooden model is prepared. This may, as is common, be preceded by a plastic (clay) model suitable for study and alteration.

Next, the wooden pattern is coated by a parting agent and then coated with a metallic conductive surface 12 preferably by spraying molten metal according to the present invention.

Figure 2:
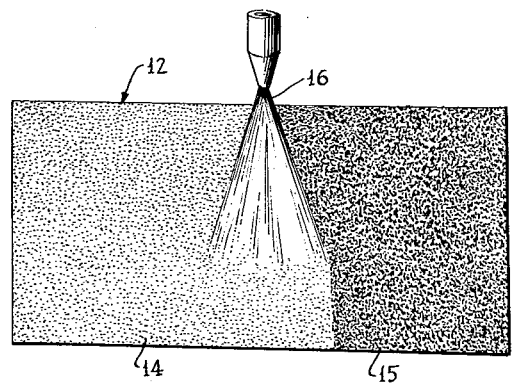
FIG. 2 is a plan view of the electrode in process of being formed.
Figure 3:
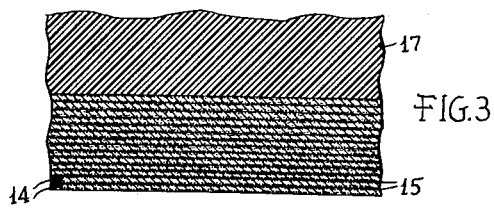
FIG. 3 is a greatly enlarged partial cross section taken on the line 3—3 of FIG. 1.

The coating, as shown exaggerated in FIGS. 2 and 3, consists of finely divided metal particles applied in layers or laminae 14 having filter material 15 such as graphite impregnated in each layer.

The finely divided metal particles 16 may be applied in various ways, as by a Schoop gun for example, in a molten spray 16. Various metals can be used, such as tin, zinc, copper and the like which can conveniently be applied. Good electrical conductivity and mechanical strength are desired and copper has proved to be very satisfactory.

If all coats are applied by the metal spray gun they may all be alike but they can be unlike so long as each metal layer bonds together and bonds to each adjacent layers.

If carbonyl gas deposit methods are used to produce the electrodes it is helpful to first spray on a base layer of metal on the model or pattern such as tin by a spray gun to cause the subsequent layers to be deposited from the carrier gas to a hot metal surface. Nickel is a metal which is easily applied by the gas deposit method. It is mechanically strong and a good conductor.

As each spray coat of molten particulate metal 14 is put on it deposits as a fine granular surface having porous cavities. Over this surface there is applied the graphite coating 15 preferably in colloidal solution which is worked down into the pores by capillary action and mechanical means and the excess rubbed off. When the next coating of spray metal 14 is applied it will bond to the many high points of the granular surface and form a strong bond therewith, the graphite thus being entrapped in and filling the porous spaces.

After a metal layer of the desired thickness has been built up a plastic backing 17 of strong stable material, epoxy with fiber glass for example, is applied over the back of the electrode layer and this is reinforced by a frame structure 18 which is sufficiently strong and rigid to hold the electrode accurately to shape. If needed, headed anchor elements may be distributed over the area of the electrode layer to bind it to the plastic backing.

Figure 1:
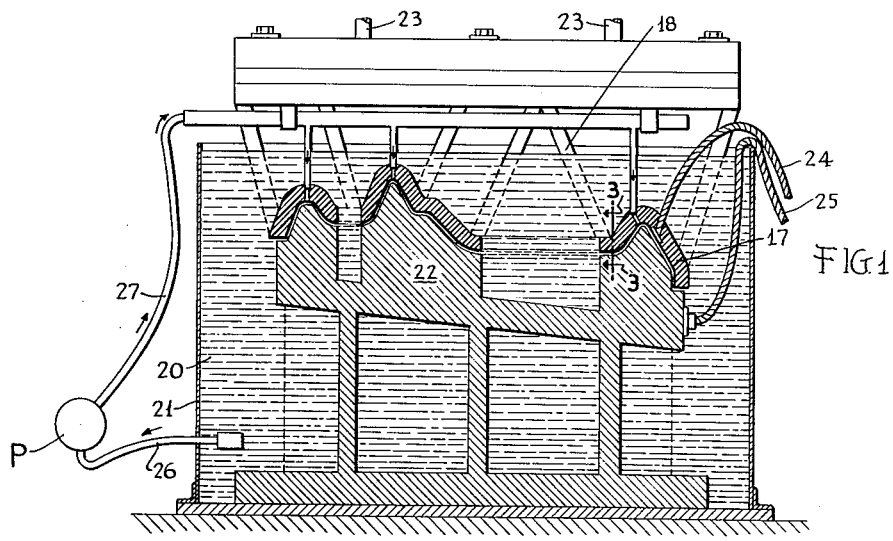
FIG. 1 is a vertical section and elevation of electro-discharge machining apparatus in which an electrode embodying the present invention is used for machining a metal-forming die.

FIG. 1 shows the backed electrode in a bath of kerosene 20 in a tank 21 in which a die 22 is being machined. Adjustable supports 23 are provided for holding the electrode assembly in position or raising it. It is to be understood that the die will be machined or cast to approximate shape before it is subjected to the electro-discharge shaping process. Also that the working surface of the electrode can be smoothed before use if it has a pebbly imperfection in the surface due to the method of spray metal deposit.

Electrode cables 24, 25 are shown as connected to the electrode and die respectively.

The space between die and electrode is critical and quite small so means are provided at spaced points, as many as necessary, for circulating liquid through the spaces to remove bubbles and sludge. The means here shown comprises a pump P, inlet pipes 26 and outlet pipe 27. At the places where there are holes in the electrode and the die is left with small unmachined areas it is necessary to clean off these small projections later.

The electrode formed by the present method has been found to have a life many times that of electrodes made from metal or graphite by metal deposit alone. It retains its accurate shape for this extended use whereas plain metal electrodes rapidly become pitted. The best solid metal electrodes and graphite electrodes disintegrate at about one fourth the rate of the die metal whereas the present electrode made from copper and graphite disintegrates at only one tenth the rate of the die metal. Not only is the electrode itself superior to those employed in the prior art, but it can be produced in a simple manner without expensive equipment by unskilled labor in a minimum of time with a surface accuracy which exceeds machining methods.

It is thus seen that the invention provides an improved spark machining electrode and an improved method of making it.

While one embodiment of the invention has been described for purposes of illustration it is to be understood that there may be various embodiments and modifications within the scope of the invention.

What is claimed is:

1. A spark machining electrode comprising a backing member and a metal electrode facing, said electrode facing consisting of a plurality of spray layers of deposited porous particulate metal with graphite deposited in the granular pores of the metal structure between layers.

2. A spark machining electrode comprising a backing member and a metal electrode facing therefor including a plurality of layers of spray deposited granular particulate metal with graphite deposited in between the granular metal structure of the layers, the particulate metal layers being bonded together around the embedded graphite.

3. The method of making a spark machining electrode which comprises, successively depositing laminate of granular particulate metal and between laminae filling the pores between granular particles with graphite.

4. The method of making a composite electrode for spark machining which comprises making a three dimensional model of the surface contour to be spark machined, spraying a very thin layer of a parting agent on said model, spraying a thin layer of porous metal on said parting agent, spraying a layer of colloidal graphite solution on said metal shell, cleaning away the excess of said colloidal graphite, spraying a second layer of porous metal on said first layer, and repeating the applications of spray metal and colloidal graphite to build up a composite porous electrode impregnated with colloidal graphite.

5. The method of making a spark machining electrode which comprises spraying over a pattern a porous mass of granular particles of conductive metal in a desired contour configuration to provide a working face from said pattern and filling said porous mass with graphite to provide a conductive porous metal impregnated electrode having a working face matching said pattern.

6. The method of making a spark machining electrode which comprises, making a pattern the size and shape of the article to be formed, depositing molten metal on said pattern in a spray to form a porous metal shell, depositing graphite on said porous shell and into the porous cavities, removing the residue of said graphite from the surface of said shell, and removing said shell from said pattern to obtain a smooth faced graphite impregnated metal shell electrode having an exact negative contour of said pattern.

7. In a method according to claim 6 wherein there is further included a plurality of layers of porous metal each impregnated with graphite.

References Cited in the file of this patent
UNITED STATES PATENTS

| | | |
|---|---|---|
| 498,141 | Siebold | May 23, 1893 |
| 1,067,003 | Deats | July 8, 1913 |
| 1,114,665 | Allen et al. | Oct. 20, 1914 |
| 1,605,432 | Fredriksen | Nov. 2, 1926 |
| 2,299,184 | Slepian et al. | Oct. 20, 1942 |
| 2,861,164 | Stegler | Nov. 18, 1958 |